US011925286B2

(12) United States Patent
Castellani (10) Patent No.: US 11,925,286 B2
(45) Date of Patent: Mar. 12, 2024

(54) SYSTEM FOR PRODUCING BEVERAGES FROM SINGLE-SERVE CAPSULES (71) Applicants: SAGA COFFEE S.P.A., Valbrembo (IT); KONINKLIJKE DOUWE EGBERTS B.V., Utrechet (NL)

(72) Inventor: Andrea Castellani, Valbrembo (IT)

(73) Assignees: SAGA COFFEE S.P.A., Valbrembo (IT); KONINKLIJKE DOUWE EGBERTS, Utrechet (NL)

(*) Notice: Subject to any disclaimer, the term of this patent is extended or adjusted under 35 U.S.C. 154(b) by 679 days.

(21) Appl. No.: 17/057,800

(22) PCT Filed: May 29, 2019

(86) PCT No.: PCT/IB2019/054447
§ 371 (c)(1),
(2) Date: Nov. 23, 2020

(87) PCT Pub. No.: WO2019/229670
PCT Pub. Date: Dec. 5, 2019

(65) Prior Publication Data
US 2021/0204749 A1 Jul. 8, 2021

(30) Foreign Application Priority Data
May 29, 2018 (IT) .................. 102018000005819

(51) Int. Cl.
A47J 31/36 (2006.01)
A47J 31/40 (2006.01)
(Continued)

(52) U.S. Cl.
CPC ......... *A47J 31/3633* (2013.01); *A47J 31/407* (2013.01); *A47J 31/4407* (2013.01); *A47J 31/469* (2018.08)

(58) Field of Classification Search
CPC .. A47J 31/3633; A47J 31/407; A47J 31/4403; A47J 31/4407; A47J 31/469
(Continued)

(56) References Cited

U.S. PATENT DOCUMENTS 10,201,243 B2 * 2/2019 Baldo .................... A47J 31/60
10,485,370 B2 * 11/2019 Ferraro ............... A47J 31/3671
(Continued)

FOREIGN PATENT DOCUMENTS

CN 101606824 A 12/2009
EP 2380471 A1 10/2011
(Continued)

OTHER PUBLICATIONS

International Search Report and Written Opinion from International Application No. PCT/IB2019/05447 dated Aug. 13, 2019.

Primary Examiner — Dana Ross
Assistant Examiner — James F Sims, III
(74) Attorney, Agent, or Firm — Dorsey & Whitney LLP (57) ABSTRACT A system for producing beverages from single-serve capsules; the system includes a capsule including a cup-shaped container with a flange, and a brewing assembly including a pressurized water injection assembly and a beverage extraction assembly relatively movable from and towards a closed configuration, in which the injection and extraction assemblies define therebetween a brewing chamber for the capsule.

9 Claims, 5 Drawing Sheets (51) Int. Cl.
  *A47J 31/44* (2006.01)
  *A47J 31/46* (2006.01)

(58) Field of Classification Search
  USPC ................................................ 99/295, 302 R
  See application file for complete search history.

(56) References Cited

U.S. PATENT DOCUMENTS

| | | | |
|---|---|---|---|
| 10,531,762 B2* | 1/2020 | McHugh | A47J 31/407 |
| 10,561,266 B2* | 2/2020 | Rijskamp | A47J 31/3628 |
| 10,750,898 B2* | 8/2020 | Fin | A47J 31/469 |
| 2001/0011502 A1 | 8/2001 | Bonanno | |
| 2018/0177328 A1* | 6/2018 | Fin | A47J 31/469 |
| 2018/0352995 A1* | 12/2018 | Fin | A47J 31/3633 |
| 2019/0059630 A1* | 2/2019 | Schlittler | A47J 31/407 |

FOREIGN PATENT DOCUMENTS

| | | |
|---|---|---|
| EP | 3313243 A1 | 5/2018 |
| WO | 03073897 A1 | 9/2003 |
| WO | 2006045536 A1 | 5/2006 |
| WO | 2009115474 A1 | 9/2009 |
| WO | 2018026273 A1 | 2/2018 |

* cited by examiner

SYSTEM FOR PRODUCING BEVERAGES FROM SINGLE-SERVE CAPSULES

CROSS-REFERENCE TO RELATED APPLICATIONS

This patent application is a U.S. National Stage of PCT International Application No. PCT/IB2019/054447 filed on May 29, 2019, which claims priority from Italian patent application no. 102018000005819 filed on May 29, 2018, the entire disclosure of each of which is incorporated herein by reference.

TECHNICAL FIELD OF THE INVENTION

The present invention is relative to a system for producing beverages from single-serve capsules containing a dose of material to be brewed or soluble material, for example coffee powder, tea, chocolate, milk, etc.

In particular, the present invention is relative to a system for the production of beverages of the type comprising a brewing assembly composed of two parts, which are axially aligned along a generally horizontal axis and are movable with respect to each other between an open position, in which they define a loading area therebetween adapted to receive a new capsule, and a closed position, in which the capsule is clamped between the two parts so as to allow a given quantity of pressurized water to be injected in the capsule for production of the beverage.

STATE OF THE ART

As is known, the single-serve capsules most commonly used in brewing assemblies of the type specified above are formed by a container made of plastic or metallic material and are provided, at the open end, with an outer annular flange, to which a thin sheet of waterproof material is welded, adapted to seal the inside of the container.

If the container does not have any opening, the capsule is sealed and it is therefore necessary that the brewing assembly be provided with perforation, tearing or cutting means able to make openings at the ends of the capsule to allow, when the brewing assembly is in the above-mentioned closed position, injection of the pressurized water at one end of the capsule and, at the opposite end, extraction of the beverage.

For said purpose, the construction technique most widely used in the production of brewing assemblies of the type specified above provides for one of the two parts of the brewing assembly to be fixed and provided with a plurality of protruding elements and an outlet channel for the beverage, while the other part is movable and is defined by a cup-shaped body arranged with its concavity facing the fixed part, in a position coaxial to the axis of the brewing assembly, and provided, on the bottom, with one or more cutting or perforation devices and a pressurized water supply channel. When the brewing assembly is brought to the closed position, the cup-shaped body moves forward towards the fixed part thus enclosing, along its path, a new capsule previously loaded between the two parts. Due to the coupling between the free edge of the cup-shaped body and the flange of the capsule, the capsule is moved against the fixed part.

In the closed position, the flange is clamped between the fixed part and the free edge of the cup-shaped body, the cutting/perforation devices extend through the bottom of the capsule and the capsule sealing sheet is in contact with the protruding elements but not yet torn. The following injection of pressurized water through the supply channel causes a pressure increase inside the cup-shaped body and the capsule, and pushes the capsule sealing sheet against the protruding elements of the fixed part with consequent tearing of the sealing sheet and subsequent outflow of the beverage through the outlet channel.

On the market non-sealed capsules also exist, i.e. capsules in which the bottom of the capsule container presents pre-formed openings and does not require perforation during closing of the brewing assembly to allow introduction of the pressurized water into the capsule. In these cases, the capsules are normally sized in order to be used in brewing assemblies provided with the above-mentioned perforation/ cutting devices.

As is known, the operation described above suffers from some serious drawbacks deriving from the fact that the flange, clamped between the fixed part and the free edge of the cup-shaped body, fails to represent, in many cases, a sealing member sufficient to prevent partial outflow of the pressurized water supplied to the cup-shaped body and to consequently allow the pressure inside the cup-shaped body to reach the value necessary to cause tearing of the sealing sheet against the protruding elements.

To overcome said drawback, numerous solutions have been proposed and marketed which generally provide for the use of a sealing member that cooperates with the flange to guarantee the seal. Said solutions can be summarily grouped into two categories:

solutions in which the sealing member is mounted on the brewing assembly in a position such as to cooperate with the flange of the capsule when the brewing assembly is in the closed position;

solutions in which the sealing member is part of the capsule and is arranged along the flange so as to cooperate with the free edge of the cup-shaped body when the brewing assembly is in the closed position.

In terms of timescale, the solutions in which the sealing member is part of the capsule were developed after the solutions in which the sealing member is part of the brewing assembly and, to date, have almost totally replaced the latter both, partly, for technical reasons and, above all, for reasons of commercial expediency of the capsule manufacturers. In fact, providing the sealing member on the capsule has enabled the capsule manufacturers to characterize the proprietary capsules so that they can be used exclusively, or at least used effectively, only with a corresponding beverage preparation machine.

This trend is bringing onto the market an increasing number of so-called closed systems for the production of beverages; said systems, although advantageous for the manufacturers, especially when they are protected by patents, represent an obvious limitation to consumer freedom of choice in terms of purchase of the capsules.

OBJECT AND SUMMARY OF THE INVENTION

The object of the present invention is to provide a system for producing beverages starting from a single-serve capsule, said system solving the above-mentioned problems.

According to the present invention, a system is provided for producing beverages from a single-serve capsule as claimed in the attached claims.

BRIEF DESCRIPTION OF THE DRAWINGS

The invention will now be described with reference to the accompanying drawings, which illustrate a non-limiting embodiment thereof, in which.

DETAILED DESCRIPTION OF PREFERRED EMBODIMENTS OF THE INVENTION

The present invention will now be described in detail with reference to the attached Figures to enable a person skilled in the art to produce and use it. Various modifications to the embodiments described will be immediately evident to persons skilled in the art and the general principles described can be applied to other embodiments and applications without departing from the protective scope of the present invention, as defined in the attached claims. Therefore, the present invention must not be considered limited to the embodiments described and illustrated, but must be given the broadest protective scope in accordance with the principles and characteristics described and claimed herein.

Figure 1:
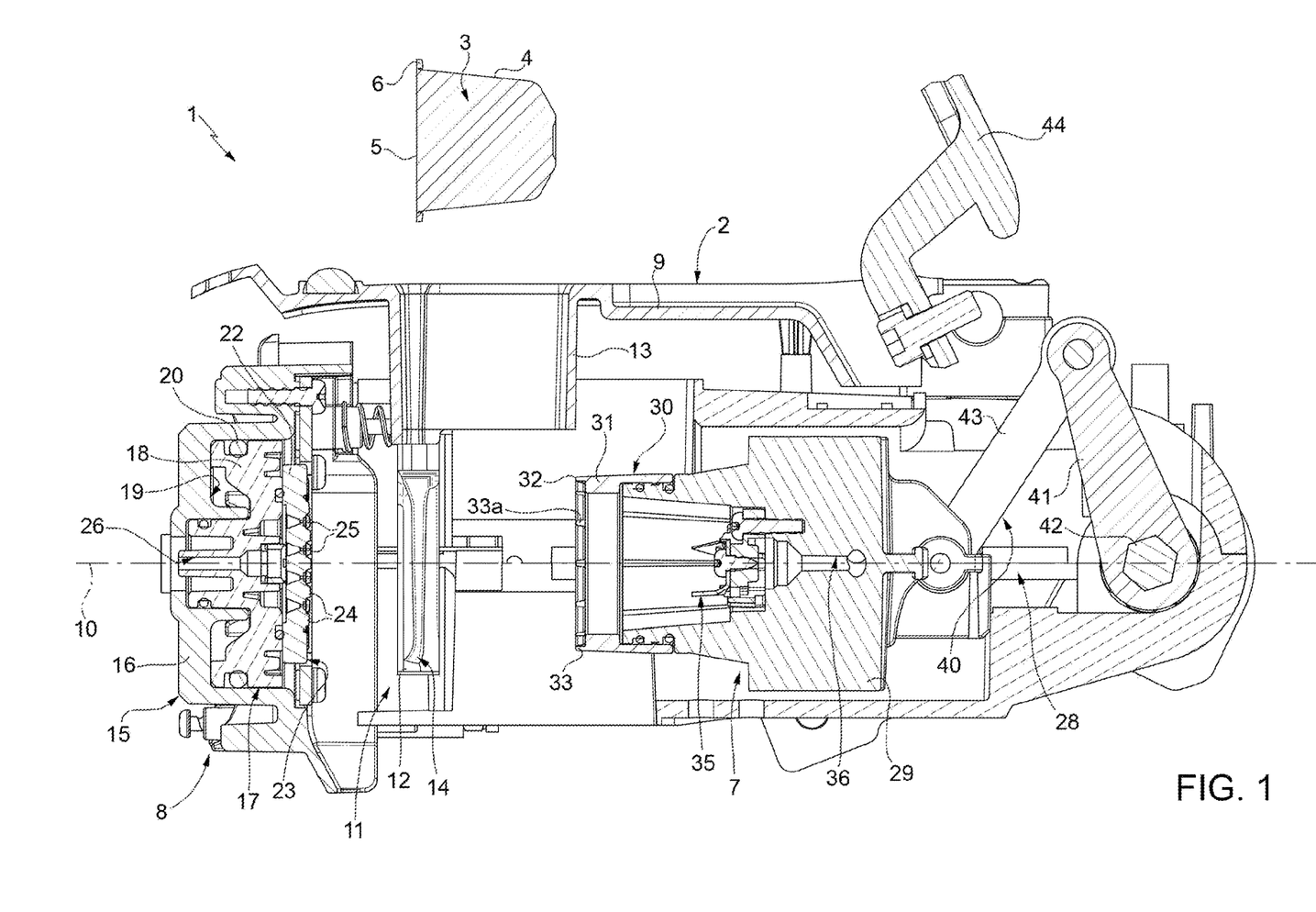
FIG. 1 illustrates, in longitudinal section and with parts removed for clarity, a preferred embodiment of the system for preparing beverages of the present invention.

In FIG. 1, the number 1 indicates overall a system for producing beverages comprising a brewing assembly 2 and a single-serve capsule 3 containing a dose of material to be brewed such as, for example, coffee powder or tea.

The capsule 3 is a capsule of known type formed of a cup-shaped container 4 made, normally by thermoforming, with a material with a high barrier effect to oxygen and humidity, typically plastic and/or aluminium, and a lid 5 permanently welded to an outer annular flange 6 of the cup-shaped container 4 and normally composed of a mono or multi-layer barrier film in plastic and/or aluminium.

The brewing assembly 2 is structured to produce an automatic brewing process, of a known type, i.e. a brewing process that provides for the injection of pressurized hot water to one of the ends of the capsule 3, which has been previously closed in a fluid-tight manner inside a brewing chamber, and extraction of the beverage through the opposite end of the capsule 3.

Figure 2:
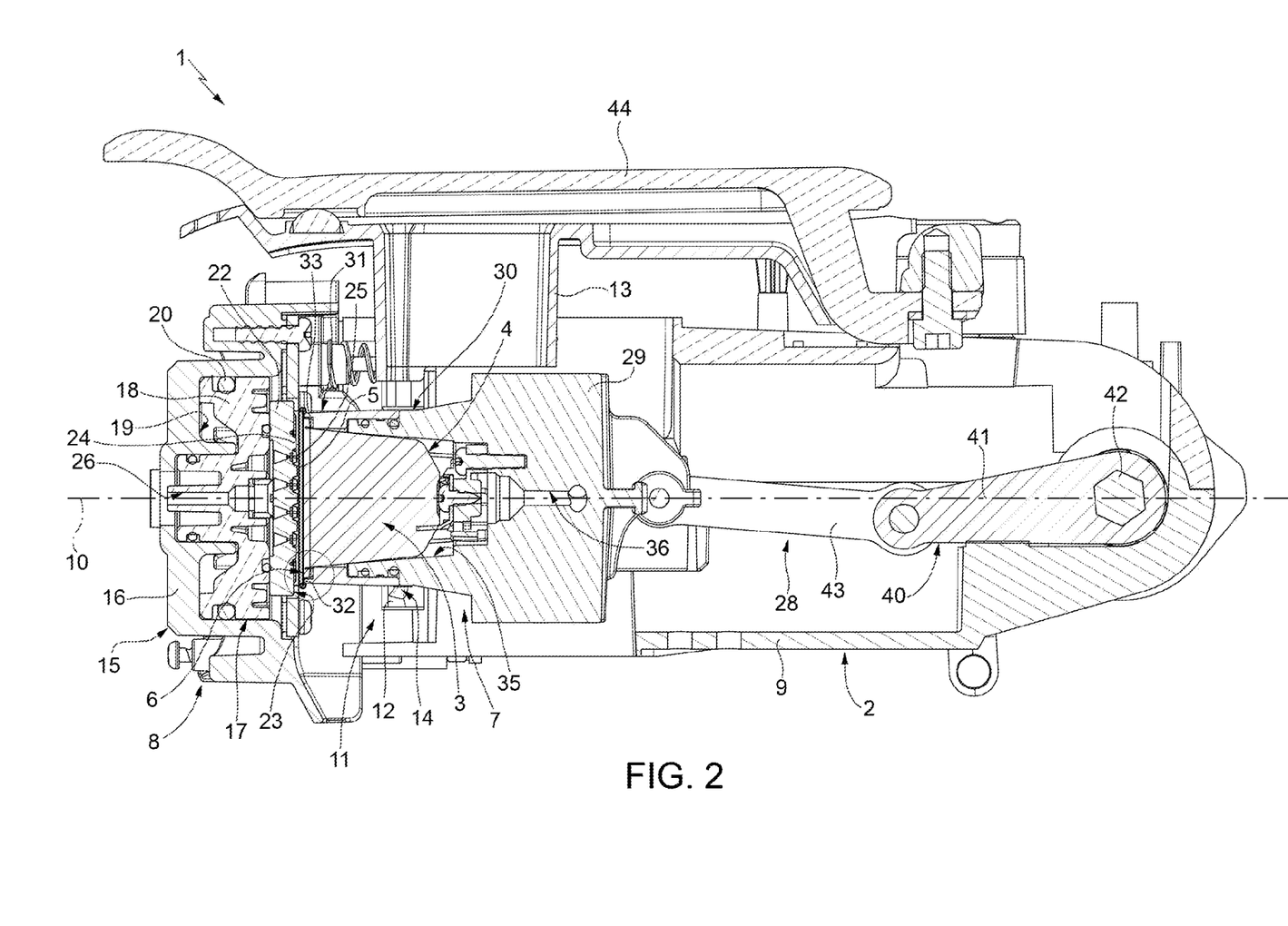
FIG. 2 illustrates the system of FIG. 1 in a different operational arrangement.

For said purpose, the brewing assembly 2 comprises, as illustrated in FIGS. 1 and 2, an injection assembly 7 and an extraction assembly 8, which are mounted on a fixed frame 9, are aligned along a substantially horizontal axis 10, and are movable with respect to each other so that the brewing assembly 2 may assume an open configuration (FIG. 1), in which the injection assembly 7 and the extraction assembly 8 are spaced so as to define a space therebetween for loading a capsule 3, and a closed configuration (FIG. 2), in which the injection assembly 7 and the extraction assembly 8 are arranged one against the other and define the above-mentioned brewing chamber therebetween.

The brewing assembly 2 further comprises a support device 11 configured both to hold a new capsule 3 between the injection assembly 7 and the extraction assembly 8 when the brewing assembly 2 is in the open configuration, both to determine exit of the used capsule 3 from the brewing chamber and subsequent dropping thereof when the brewing assembly 2 returns to the open configuration at the end of preparation and extraction of the beverage.

As illustrated in FIG. 2, the support device 11 is a clamping device of known type and comprises two jaws 12 mounted one facing the other, on opposite sides of the axis 10, below a fixed tubular element 13, which is shaped to receive, and guide towards the support device 11, a capsule 3 oriented with its own longitudinal axis substantially parallel to the axis 10 and with the lid 5 facing the extraction assembly 8.

Each jaw 12 has a groove 14 open towards the tubular element 13 and closed at the opposite end and adapted to be engaged, in use, by the flange 6 of a new capsule 3 to hold, together with the other groove 14, the capsule 3 between the injection assembly and the extraction assembly 8, with the lid 5 facing the extraction assembly 7.

The jaws 12 are mounted on the frame 9 to oscillate around respective pins and against the action of respective springs, between a normal closed or loaded position (FIG. 1), in which they support the capsule 3, and a divaricated or disengaged position (FIG. 2), in which the jaws 12 are moved away from each other by the injection assembly 7 and leave the capsule 3 free to move forward with the latter towards the extraction assembly 8.

As illustrated in FIGS. 1 and 2, the extraction assembly 8 comprises a hydraulic cylinder 15 in turn comprising a cylindrical body 16 fixed integral with the frame 9 and a piston 17 mounted in an axially sliding manner inside the cylinder body 16 to move, during operation and against the action of elastic return means (not illustrated), along the axis 10 between a retracted position (FIGS. 1 and 2) and an extracted position.

In particular, the piston 17 comprises a guide body 18, which has an outer lateral surface coupled in a sliding manner to an inner lateral surface of the cylinder body 16, has a first axial end facing the injection assembly 7 and a second axial end facing a bottom of the cylinder body 16 and defining, with the latter, a variable volume chamber 19 closed in a fluid-tight manner by a gasket 20 and communicating with a hydraulic circuit 21, which will be described in detail below, for supply and flow of the water operating the piston 17.

On the part facing the injection assembly 7, the piston 17 has a head portion, which axially projects from the corresponding end of the cylinder body 16 and is composed of a plate 22 integral with the guide body 18 and bounded at the front by a flat surface 23 perpendicular to the axis 10.

The plate 22 is further provided, on the flat surface 23, with a plurality of protrusions 24 generally having the shape of a (truncated) pyramid and a plurality of through holes 25, which are distributed between the protrusions 24 and extend through the plate 22 to convey, during operation, the beverage extracted from the capsule 3 into an outlet duct 26 made in the cylinder body 16 and communicating, as illustrated below, with the hydraulic circuit 21.

As illustrated in FIGS. 1 and 2, the injection assembly 7 comprises a cup 27, which is coaxial to the axis 10, is arranged with its own open end facing the extraction assembly 8, and is mounted to move, under the action of an actuator device 28 and along the axis 10, between an inoperative backward position (FIG. 1), which corresponds to the open configuration of the brewing assembly 2, and an operative forward position (FIGS. 2 and 3), in which it is arranged close to the extraction assembly 8.

The cup 27 comprises a bottom wall 29, which extends transversally to the axis 10, and a lateral wall 30, which extends from the bottom wall 29 towards the extraction assembly 8 and comprises a distal portion 31 limited by a free edge 32 lying on a plane perpendicular to the axis 10.

According to the preferred embodiment illustrated in the attached Figures, the distal portion 31 has a reduced-thickness end part 33, which is obtained by means of a circumferential recess in a cylindrical internal surface of the distal portion in the area adjoining the free edge 32. In a different variation not illustrated, the reduced-thickness end part 33 can be obtained by means of a circumferential recess in the cylindrical external surface of the distal portion 31 or by means of a tapering of the distal portion 31.

The reduced-thickness end part 33 can have a uniform thickness or thickness decreasing towards the free edge 32. Preferably, close to the free edge 32, the thickness of the reduced-thickness end part 33 is equal to the radial breadth of the free edge 32 and is in the order of 1 mm, expediently equal to or less than 1 mm.

According to the preferred embodiment illustrated in the attached Figures, the distal portion 31 is defined by a sleeve, which is connected in a detachable manner, with the interposition of sealing gaskets, to the remainder of the lateral wall 30 so as to be axially and angularly fixed with respect to the latter.

The fact that the lateral wall 30 is not made in one single piece, but the distal portion 31 is a distinct piece, allows the distal portion 31 to be made with a material different from the remainder of the lateral wall 30, in particular a material more suited to the sealing function performed by the free edge 32, and also allows replacement of the distal portion 31 if necessary, for example in the event of wear or breakage.

According to a variation not illustrated, the distal portion 31 is made in one single piece with the remainder of the lateral wall 30.

The cup 27 defines an inner cavity 34, at the bottom of which a perforation device 35 is arranged adapted, during operation, to penetrate the bottom of the container 4 to realize openings to allow the injection, into the capsule 3, of pressurized hot water coming from a supply duct 36 which communicates, in the manner that will be illustrated below, with the hydraulic circuit 21.

The cavity 34 is configured so as to axially receive a capsule 3, previously loaded in the support device 11, when the actuator device 28 moves the cup 27 from the backward position towards the forward position. During this movement the cup 27 progressively encloses the capsule 3, disengaging it from the support device 11 by divarication of the jaws 12, and moves it towards the extraction assembly 8 until the lid 5 of the capsule 3 is positioned against the protrusions 24 of the plate 22.

The last stretch of the forward movement of the cup 27 and, therefore, insertion of the capsule 3 inside the cup 27, allows the perforation device 35 to penetrate the bottom of the capsule 3 and the free edge 32 to engage the flange 6, which, in the forward position of the cup 27 (FIG. 2), is resting, or substantially resting, on the flat surface 23 which surrounds the protrusions 24.

In order for the above to happen, the cavity 34 is shaped so as to accommodate the capsule 3 with relative precision in axial and transversal direction. In particular, the length of the cavity 34, i.e. the axial distance between the free edge 32 and the bottom of the cavity 34, is chosen so as to exceed the height of the container 4 of the capsule 3, thus not axially compressing the capsule 3 when it is pushed against the plate 22, but at the same time guaranteeing interaction of the bottom of the capsule 3 with the perforation device 35.

In a transversal direction, the width of the cavity 34 is chosen so that, when the capsule is completely inserted in the cup 27, the clearance between capsule 3 and inner lateral surface of the cavity 34 is as small as possible.

Figure 3:
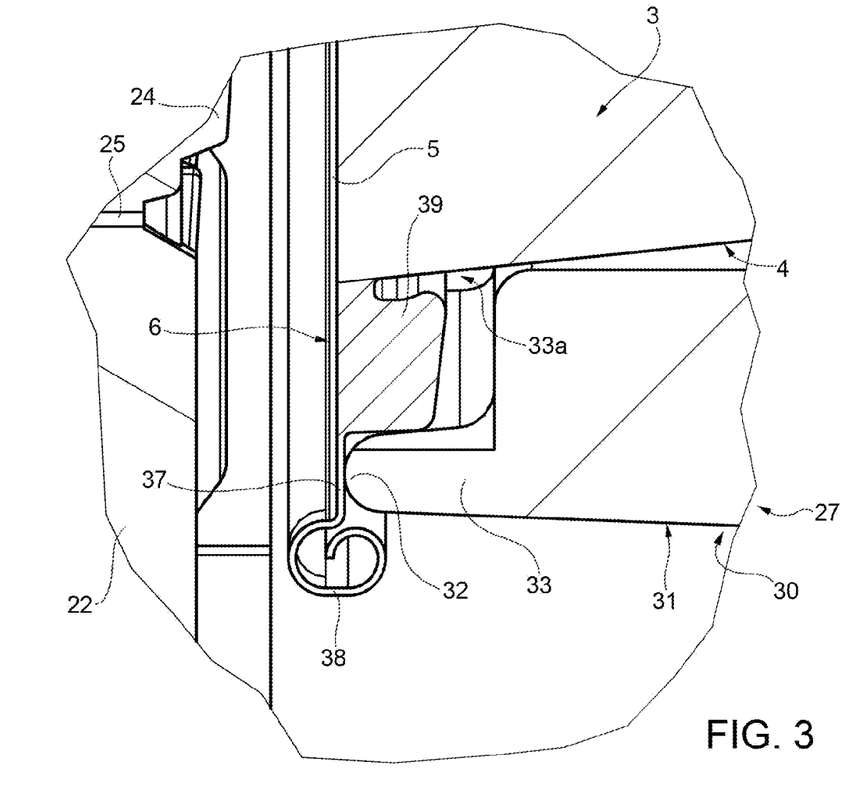
FIG. 3 illustrates, on an enlarged scale, a detail of FIG. 1.

As illustrated in FIG. 3, the diameter of the cup 27, measured at the free edge 32, is chosen so that, when it engages the flange 6, the free edge 32 comes into contact with a peripheral annular crown 37 of the flange 6, i.e. with the annular portion of the flange 6 which is arranged close to an outer edge 38 of said flange 6.

In particular, as illustrated in FIG. 3, if, as normally happens with the majority of capsules on the market, the flange 6 is provided with an annular sealing element 39 arranged close to or adjoining the lateral wall of the container 4 (FIG. 3), the annular crown 37 is an annular portion of the flange 6 arranged radially on the outside of the sealing element 39.

In this case, therefore, no interaction occurs between the free edge 32 and the sealing element 39 which, consequently, does not perform the function for which it is intended, i.e. guaranteeing the fluid seal along the flange 6 when the brewing assembly 2 is in the closed position. Preferably, furthermore, the reduced-thickness end part 33 has an axial extension such that, when the free edge 32 compresses the flange 6, the sealing element 39 is contained within the reduced-thickness end part 33 without being substantially crushed by the part of the distal portion 31 having a greater thickness than the reduced-thickness end part 33.

In other words, the presence of the reduced-thickness end part 33 therefore ensures that the free edge 32 engages the flange 6 in an annular area with width, measured in a radial direction, significantly reduced with respect to the total width of the flange 6 and, preferably, free from any sealing elements that may be carried by said flange 6. Generally, the annular area of the flange 6 engaged by the free edge 32 is a flat annular area lying on a plane generically perpendicular to the axis 10.

Figure 6:
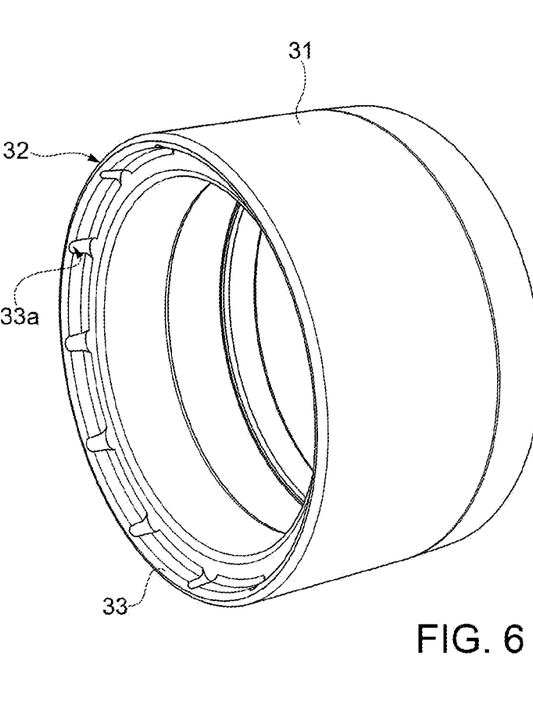
FIG. 6 illustrates, on an enlarged scale, a detail of FIG. 1.

Preferably, according to the preferred embodiment illustrated in the attached figures, in particular in FIGS. 1 and 6, the thickness of the reduced-thickness end part 33 is sized in a manner such that the reduced-thickness end part 33 does not axially compress the sealing element 39, when the free edge 32 engages the annular crown 37 of the flange 6, but is designed to perform, when necessary, a centring action to centre the flange 6 with respect to the free edge 32 during the forward movement of the cup 27 into the forward position.

The interaction between the reduced-thickness end part 33 and sealing element 39 does not produce any type of sealing effect, not even in a radial direction since, when the cup 27 is in the forward position, the internal surface of the reduced-thickness end part 33 surrounds the sealing element 39 without exerting any radial compression with sealing effect. In fact, independently of the contact in a radial direction between the reduced-thickness end part 33 and the sealing element 39, any possible sealing effect by a radial adherence is prevented by the presence of a plurality of recesses 33*a* formed in the cylindrical internal surface of the reduced-thickness end part 33.

With reference to FIGS. 1 and 2, the actuator device 28 adapted to move the cup 27 comprises a mechanism 40 formed of a crank 41, which is fitted on a pin 42 rotatable around a horizontal axis perpendicular to the axis 10, and a pair of parallel connecting rods 43 (only one of which can be seen in the attached Figures), one end of which is hinged to the free end of the crank 41 and the opposite end is hinged to the bottom wall 29 of the cup 27.

The pin 42 is rotated around its own axis by means of a system of levers (not illustrated) which cinematically connect the pin 42 to a lid 44 of the brewing assembly 2 so that the movement of the lid 44 from a raised position (FIG. 1)

to a lowered position (FIG. 2) causes the cup 27 to move from its backward position to its forward position and, vice versa, the movement of the cover 38 from the lowered position (FIG. 2) to the raised position (FIG. 1) causes the cup 27 to return from the forward position to the backward position.

According to alternative embodiments (not illustrated), the cup 27 can be reciprocated by means of an actuator device different from the one described above, on the condition that it is suitable for the purpose.

Operation of the system for producing beverages 1 will be described below with reference to FIGS. 1 and 2 and, in particular, FIG. 4 which schematically illustrates the hydraulic circuit 21.

Figure 4:
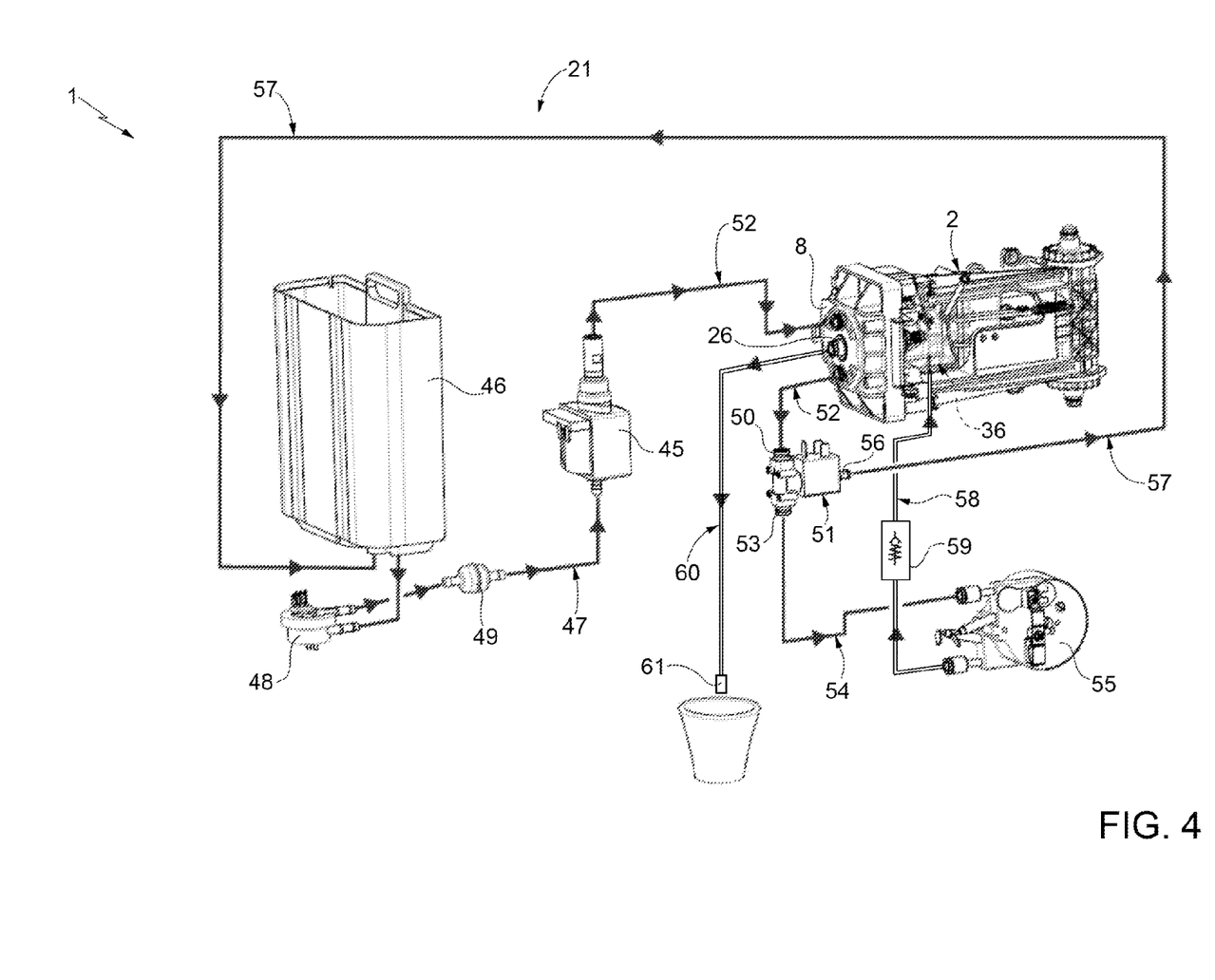
FIG. 4 schematically illustrates the hydraulic circuit of the system for producing beverages of the present invention.

As illustrated in FIG. 4, the hydraulic circuit 21 comprises a pump 45 connected, on the suction side, to a cold water supply, in this case a tank 46, by means of a cold line 47 comprising a volumetric counter 48 and a filter 49.

On the pressure side, the pump 45 is connected to an inlet 50 of a three-way solenoid valve 51 by means of a cold line 52, which extends through the variable volume chamber 19 of the hydraulic cylinder 15.

The three-way solenoid valve 51 comprises, in addition to the inlet 50, two outlets, of which a first outlet 53 is adapted, when it communicates with the inlet 50, to connect the cold line 52, i.e. the variable volume chamber 19, to a cold line 54 which extends from the three-way solenoid valve 51 to the inlet of a continuous-flow boiler 55, while a second outlet 56 is adapted, when it communicates with the inlet 50, to connect the cold line 52, i.e. the variable volume chamber 19, to a cold line 57 which extends from the three-way solenoid valve 51 to the tank 46.

The outlet of the boiler 55 is connected to the supply duct 36 of the injection assembly 7 by means of a hot line 58, which comprises, upstream from the supply duct 36, a check valve 59 set to open when the pressure upstream from the check valve 59 reaches a given threshold value. Preferably the threshold value is in the order of 5 bar.

Lastly, the hydraulic circuit 21 comprises an outlet line 60 which establishes fluidic communication between the outlet duct 26 in the extraction assembly 8 and a delivery nozzle 61 of the beverage.

The beverage production cycle begins with the loading of a capsule 3 (FIG. 1) into the support device 11, when the lid 44 is raised and the cup 27 is in its backward position.

Lowering of the lid 44 causes movement of the cup 27 up to its forward position, in which the free edge 32 engages the flange 6 at the annular crown 37 (FIG. 2).

At this point, following an external command, an electronic control unit (not illustrated) controls the three-way solenoid valve 51 so as to establish communication between the inlet 50 and the outlet 53, and activates the pump 45, which draws the cold water from the tank 46 and transfers it, at increased pressure, to the variable volume chamber 19 through the cold line 52 and to the boiler 55 through the three-way solenoid valve 51 and the cold line 54.

In the boiler 55, the water is heated to the predefined temperature and flows into the hot line 58, as far as the check valve 59.

The supply of pressurized cold water to the variable volume chamber 19 causes movement of the piston 17 to its extracted position and consequent compression of the plate 22 against the free edge 32.

In this way, the flange 6, arranged between the plate 22 and the free edge 32, is subjected by the piston 17 to an "active" axial compression force such as to guarantee a perfect fluid-tight seal along the annular crown 37 of the flange 6.

When the variable volume chamber 19 has reached maximum expansion, the pressure downstream of the check valve 59 increases until it reaches the calibration pressure with consequent opening of the check valve 59 and supply of the pressurized hot water to the supply duct 36 and, therefore, to the capsule 3. The pressure increases inside the cup 27 and the capsule 3 causes movement and breakage of the lid 5 of the capsule 3 against the protrusions 24 thus allowing the beverage to outflow from the capsule 3 and reach, through the outlet duct 26 and the outlet line 60, the delivery nozzle 61.

At the end of the delivery, the control unit (not illustrated) commands stoppage of the pump 45 and controls the three-way solenoid valve 51 so as to establish communication between the inlet 50 and the outlet 56. The pressure drop in the cold line 52 due to stoppage of the pump 45 causes retraction of the piston 27 and the outflow of the remaining water through the cold line 57.

The above illustrates the advantages of the system for producing beverages 1 of the present invention with respect to the known systems currently available on the market.

In particular, the advantages pertain to the synergic combination between the hydraulic cylinder 15, which moves the extraction assembly 8, and the conformation of the cup 27.

The fact that the free edge 32 of the cup 27 has a thickness and a diametric size such as to engage the flange 6 only along the narrow annular crown 37 arranged close to the outer edge of the flange 6 and, preferably, in a position radially external to an annular sealing element carried by the flange 6, means that the effectiveness of the seal on the flange 6 is totally independent of the presence, shape and dimension of any sealing element arranged on the flange 6, said effectiveness being guaranteed by the axial force with which the piston 27 presses the flange 6 against the free edge 32.

It follows that correct operation of the brewing assembly 2 is not conditioned either by the presence nor by the type of sealing element 39 of the capsule 3 and this considerably widens the choice of capsules that the user can purchase out of those available on the market.

Furthermore, the reduced contact/seal area provided by the annular crown 37, together with the fact that the piston 17 retracts immediately as soon as the pump 45 is stopped and the pressure in the hydraulic circuit 21 drops, result in immediate and sudden opening of the cup 27 and, consequently, an equally sudden emptying of the remaining water in the cup 27, without the need to provide specific drainage ducts in the cup 27.

As regards operation of the piston, it should be highlighted that operation by means of cold water provides a significant advantage in terms of reliability of the hydraulic cylinder 15 and, therefore, effectiveness of the fluid-tight coupling between the flange 6 and the free edge 32.

In fact, the use of cold water to operate the piston 17 significantly reduces, with respect to operation with hot water, both the deposit of timescale and the thermal stress to which the hydraulic cylinder 15 is subjected.

Furthermore, the brewing assembly 2 offers a further advantage deriving from the positioning of the hydraulic cylinder 15 on the extraction assembly 8 instead of on the injection assembly 7. In fact, in this manner, the hydraulic cylinder 15 is located on the part of the brewing assembly 2 having the lowest temperature, i.e., the part of the brewing assembly 2 from which the beverage outflows, and, consequently, the thermal exchange is significantly limited between, on one hand, the continuous flow of cold water that passes through the hydraulic cylinder 15 during the delivery process and, on the other hand, the part of the brewing assembly 2 having the highest temperature, i.e., the part of the brewing assembly 2 from which the hot water is supplied to the capsule 3 to extract the beverage, thus improving the thermal performance of the brewing assembly 2 and the extraction quality.

Figure 5:
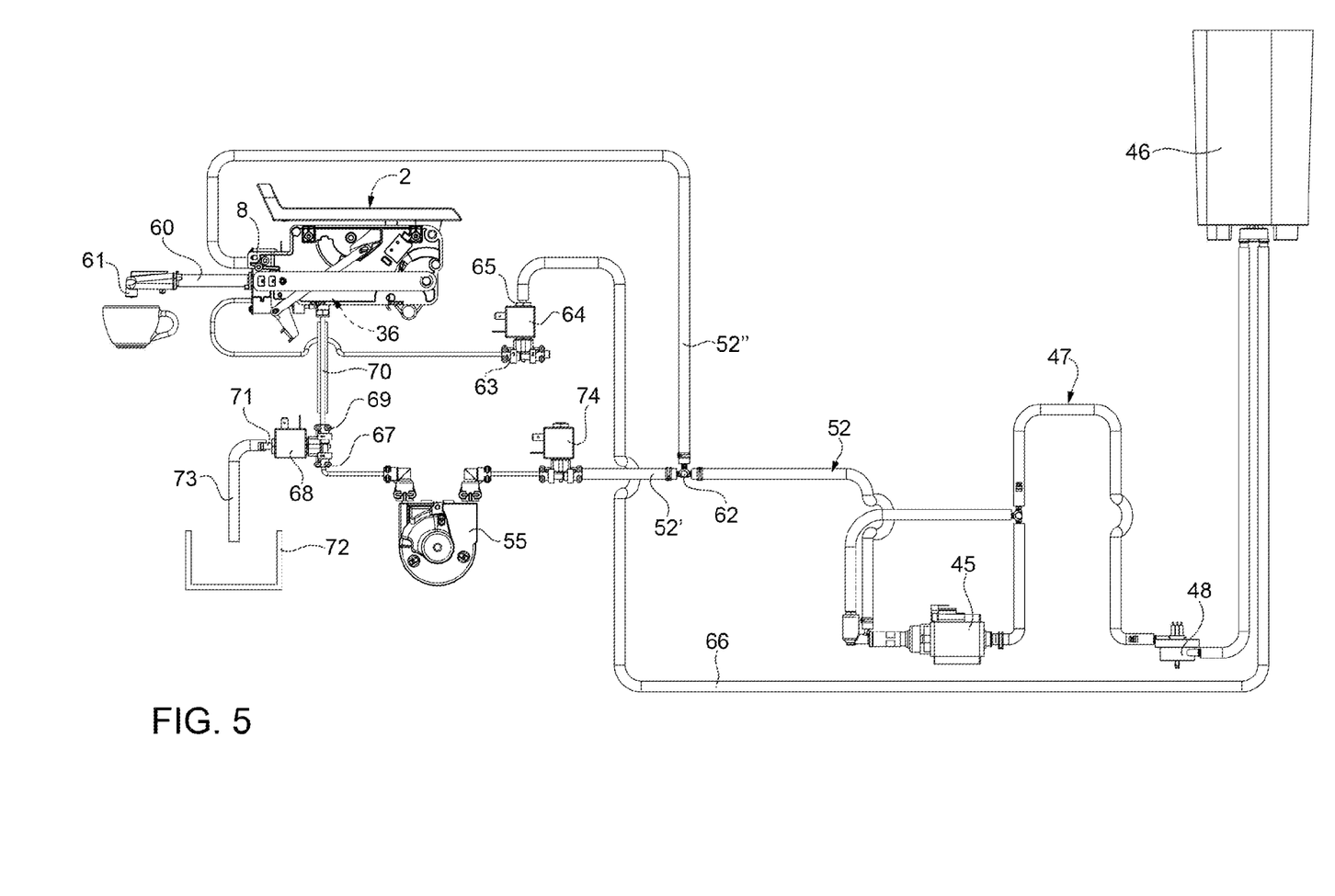
FIG. 5 illustrates a further embodiment of the hydraulic circuit of the system for producing beverages of the present invention.

FIG. 5 shows a further embodiment of the hydraulic circuit 21, where the same or similar components as those in the hydraulic circuit 21 shown in FIG. 4 are designated by the same or similar reference numerals.

In short, the hydraulic circuits 21 shown in FIGS. 4 and 5 differ in the part of the circuit downstream of the pump 45 and, in particular, in that in the hydraulic circuit 21 of FIG. 5 the hydraulic cylinder 15 and the boiler 55 are supplied by the pump 45 in parallel through two distinct cold lines, so that the cold water that operates the hydraulic cylinder 15 is not the same water that is supplied, through the boiler 55, to the supply duct 36 to extract the beverage from the capsule.

As shown in FIG. 5, the cold line 52 connected to the delivery of the pump 45 has a bifurcation 62, defined for example by a T-joint, from which a first cold line 52' and a second cold line 52" branch off.

The cold line 52' extends from the bifurcation 62 through the hydraulic cylinder 15 up to the inlet 63 of a two-way solenoid valve 64, the outlet 65 of which is connected to the tank 46 through a recirculation line 66.

The cold line 52" extends from the bifurcation 62 through the boiler 55 up to the inlet 67 of a three-way solenoid valve 68, a first outlet 69 of which is connected to the supply duct 36 of the injection assembly 7 through a hot line 70, and a second outlet 71 is connected to a collection container 72 through an outlet line 73.

The cold line 52" is provided with a non-return valve 74 arranged between the bifurcation 62 and the inlet of the boiler 55, the valve being conveniently a two-way solenoid valve.

The two-way solenoid valve 64, the three-way solenoid valve 68 and the non-return valve 74 are electronically controlled by the electronic control unit (not shown) so that the two-way solenoid valve 64 is normally open, while the three-way solenoid valve 68 and the non-return valve 74 are normally closed.

Alternatively, the non-return valve 74 can be a throttling valve having a predetermined opening pressure, for example 2 bar. The non-return valve 74 is normally closed and is configured to open when the pressure upstream from the valve rises above the predetermined opening pressure.

When a production cycle has started, the electronic control unit commands the closing of the inlet 63 of the two-way solenoid valve 64 and the start of the pump 45 so that the cold water drawn from the tank 46 is supplied, through the cold line 52', to the variable volume chamber 19 of the hydraulic cylinder 15, so causing the piston 17 to move to the extracted position and compress, in a fluid-tight manner, the annular crown 37 of the flange 6 between the plate 22 and the free edge 32 of the cup 27.

At this point, the electronic control unit commands the opening of the non-return valve 74 and controls the three-way solenoid valve 68 so as to open the inlet 67 and close the outlet 71 thus causing the pressurized cold water to flow through the boiler 55 and supply pressurized hot water to the supply duct 36 to achieve the delivery process of the beverage.

At the end of the delivery, the electronic control unit commands the stoppage of the pump 45, the closing of the non-return valve and opens the two-way solenoid valve 64 so that the pressurised water, contained in the branch between the pump 45 and the non-return valve 74 and along the cold line 52", flows to the tank 46 through the recirculation line 66.

After a certain period of time, the electronic control unit commands the closing of the inlet 67 of the three-way solenoid valve 68 and the opening of the outlet 69 so that the pressurized hot water still inside the cup 27 flows out into the collection container 72 and does not leak through the delivery nozzle 61.

The hydraulic circuit 21 described above with reference to FIG. 5 has the advantage of separating the hydraulic circuit downstream of the pump 45 in two branches, of which:

one branch is designed to operate the hydraulic cylinder 15 and is provided with the two-way solenoid valve 64 downstream of the hydraulic cylinder 15 to selectively connect the hydraulic cylinder 15 to the pump 45 or to the tank 46 (or, alternatively, to an outlet), and one branch is intended for the delivery process, namely to supply the pressurized hot water to the capsule 2, and is provided with the non-return valve 74 arranged upstream from the boiler 55 for isolating the hot circuit portion from the cold circuit portion arranged upstream from the boiler 55.

This architecture of the hydraulic circuit 21 produces the following advantageous effects:

when the pump 45 is stopped at the end of the delivery process and the non-return valve 74 is closed, the remaining hot water present between the boiler 55 and the supply duct 36 is prevented from returning by the non-return valve 74 to the tank 46 through the cold line 52' and, therefore, is prevented from entering the pump 45 again;

during the delivery process, the water inside the hydraulic cylinder 15 is static and this further improves the advantageous effects, in terms of thermal delivery performance, deriving from the arrangement of the hydraulic cylinder 15 on the extraction assembly 8;

the possibility of fluidically isolating the branch comprising the hydraulic cylinder 15 from the branch comprising the boiler 55, the hot line 70, and the outlet line 60 allows to perform, along the two branches, separate and independent cleaning processes according to the specific needs of each branch and the hydraulic components arranged thereon.

The invention claimed is:

1. A system for producing beverages from single-serve capsules, the system comprising:

a capsule including a cup-shaped container having an outer annular flange and closed by a lid welded to the outer annular flange; and a brewing assembly including a pressurized water injection assembly and a beverage extraction assembly aligned along an axis and relatively movable between an open configuration, in which the pressurized water injection assembly and the beverage extraction assembly define a capsule loading space therebetween, and a closed configuration, in which the pressurized water injection assembly and the beverage extraction assembly are arranged one against the other and define a brewing chamber for the capsule therebetween;

wherein the pressurized water injection assembly includes a cup that is arranged with a free edge thereof towards the beverage extraction assembly, and is mounted to move between an inoperative backward position and an operative forward position, in which, during operation, the cup houses said capsule and the free edge either engages or is arranged close to the outer annular flange of the capsule;

wherein the extraction assembly includes a hydraulic cylinder including a fixed cylindrical body and a piston that includes a head portion facing the pressurized water injection assembly, and is axially slidably mounted in the cylindrical body to axially slide between a normal backward position and an extracted position, in which, the head portion is compressed against the free edge of the cup arranged in the operative forward position with an axial force such as to couple the outer annular flange and the free edge in a fluid-tight manner; and wherein the free edge of the cup has a thickness, measured radially, and a diametral size are so sized that the free edge engages the outer annular flange only at annular area of the outer annular flange arranged close to an outer circumferential edge of the outer annular flange, so that said annular area is arranged in a radially outer position to any sealing element of the capsule associated with the outer annular flange.

2. The system of claim 1, wherein the cup includes a bottom wall transversal to the axis, and a lateral wall that is coaxial to the axis and includes a distal portion having a reduced-thickness end portion that has a reduced thickness with respect to that of the remaining distal portion and is bounded at an end thereof by said free edge.

3. The system of claim 2, wherein the reduced-thickness end portion has a thickness that is uniform or decreasing towards the free edge.

4. The system of claim 2, wherein the distal portion is coupled to the remainder of the lateral wall in a demountable manner.

5. The system of claim 2, wherein the reduced-thickness end portion is defined by a circumferential recess in an internal surface of the cup.

6. The system of claim 2, wherein the reduced-thickness end portion has, on an internal surface coaxial to said axis, a plurality of recesses distributed around the axis.

7. The system of claim 1, wherein the head portion of the piston includes a plate that is bounded on a side thereof facing the cup by a flat surface perpendicular to the axis, and is provided with a plurality of protrusions projecting from the flat surface and adapted to tear open the lid of the capsule when the brewing assembly is in the closed configuration and pressurized hot water is injected into the capsule.

8. The system of claim 1, further comprising:

a hydraulic circuit including a cold water supply and a supply line that connects the cold water supply to the pressurized water injection assembly;

wherein supply line includes a first stretch that extends, in series, starting from the cold water supply, through a pump, the hydraulic cylinder of the beverage extraction assembly, a boiler and a check valve; and a second stretch that connects the check valve to the pressurized water injection assembly;

wherein the check valve is set to open when, during operation, water pressure along the first stretch, downstream of the pump, reaches a pre-set threshold pressure.

9. The system of claim 1, further comprising:

a hydraulic circuit including a cold water supply, a pump fluidically connected, on a suction side, to the cold water supply, and two branches fluidically connected to a delivery of the pump;

wherein a first branch of the two branches extends through a boiler up to the pressurized water injection assembly and is provided with a non-return valve arranged upstream from the boiler and with a three-way solenoid valve arranged downstream of the boiler to selectively connect an outlet of the boiler to the pressurized water injection assembly or to an outlet duct;

wherein a second branch of the two branches extends through the hydraulic cylinder and is provided with a three-way solenoid valve arranged downstream of the hydraulic cylinder to connect an outlet of the hydraulic cylinder to a recirculation duct flowing into a tank or to an outlet duct.

* * * * *